(12) United States Patent
Wouterse

(10) Patent No.: US 9,344,866 B2
(45) Date of Patent: May 17, 2016

(54) NOTIFYING ROAMING SUBSCRIBER OF MISSED CALL

(75) Inventor: Wim Wouterse, Tilburg (NL)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 929 days.

(21) Appl. No.: 13/514,733

(22) PCT Filed: Dec. 11, 2009

(86) PCT No.: PCT/EP2009/066989
§ 371 (c)(1),
(2), (4) Date: Sep. 13, 2012

(87) PCT Pub. No.: WO2011/069560
PCT Pub. Date: Jun. 16, 2011

(65) Prior Publication Data
US 2013/0005308 A1    Jan. 3, 2013

(51) Int. Cl.
*H04M 11/10*   (2006.01)
*H04W 4/16*   (2009.01)
*H04W 8/26*   (2009.01)

(52) U.S. Cl.
CPC .. *H04W 4/16* (2013.01); *H04W 8/26* (2013.01)

(58) Field of Classification Search
CPC .................................. H04W 4/16; H04W 8/26
USPC .................................................. 455/413–420
See application file for complete search history.

(56) References Cited

U.S. PATENT DOCUMENTS

| 6,091,949 | A   | * | 7/2000 | Sanchez ......................... 455/417 |
| 8,644,802 | B2 | * | 2/2014 | Elkarat et al. ................. 455/413 |
| 8,649,769 | B2 | * | 2/2014 | Teng ............................. 455/411 |
| 2002/0137498 | A1 |  | 9/2002 | Goss et al. |
| 2005/0164702 | A1 | * | 7/2005 | Carlson et al. ............ 455/432.1 |
| 2006/0178135 | A1 | * | 8/2006 | Jiang et al. ................ 455/414.1 |
| 2006/0240820 | A1 | * | 10/2006 | Jiang ......................... 455/432.1 |
| 2011/0045805 | A1 | * | 2/2011 | Elkarat et al. ................ 455/413 |

FOREIGN PATENT DOCUMENTS

| EP | 1531647 | A2 | 5/2005 |
| EP | 2099204 | A1 | 9/2009 |
| JP | 2002354549 | A | 12/2002 |
| JP | 2009194464 | A | 8/2009 |

* cited by examiner

*Primary Examiner* — Shahriar Behnamian
(74) *Attorney, Agent, or Firm* — Coats & Bennett, P.L.L.C.

(57) ABSTRACT

In a first node of a home network, such as a GMSC, on receiving a request message (50), requesting call set-up to a called terminal, a message (52) is sent to a second node of the home network, such as an HLR, to obtain an address of a mobile switching center where the called terminal is located. On receiving a reply (58) from the second node, the first node initiates (60) a missed call notification service if it is determined that the called terminal is in a visited network. The first node then initiates a call set-up (64) to the called terminal and, if it is notified that the call has been released (66), with no call forwarding having taken place, it notifies (68) the missed call notification service that the call has been released. The missed call notification service causes (72) a message to be sent (74) to the called terminal, notifying it of the missed call.

17 Claims, 4 Drawing Sheets

NOTIFYING ROAMING SUBSCRIBER OF MISSED CALL

TECHNICAL FIELD

This invention relates to a mobile telecommunications network, and in particular to a method for notifying a roaming subscriber of a missed call.

BACKGROUND

Voicemail systems are widely used in telecommunications systems, such as cellular communication systems. When a calling subscriber (the A-party) places a call to a called subscriber (the B-party) and the B-party does not answer, is busy or is not reachable, the call is forwarded to the voicemail system of the relevant communications network. Many voicemail systems used by mobile network operators will then send a Short Message System (SMS) to the B-party, informing the subscriber about the missed call, and thus allowing him to place a return call.

Mobile networks typically have a limited geographical extent, and therefore, in order to allow maximum accessibility, mobile network operators typically have roaming agreements with other mobile network operators, whose networks cover other geographical areas. This allows a call to be placed to a called subscriber, even when he is outside the geographical coverage area of his home network. However, when the B-party is roaming, and misses a call, the process of forwarding the call to the voicemail system in the user's home network, as described above, may be somewhat expensive.

One known alternative solution is the Local Voicemail Deposit (LVD) solution, described briefly in the document "IN and NGIN applications portfolio" from Ericsson. With this solution, when the B-party is roaming and misses a call, the call will be forwarded locally to the voicemail. The advantage of this solution is that the local call forwarding is free of charge. However, this solution only works in a straightforward manner for postpaid subscribers. The solution for prepaid subscribers is very complex, and the result is that many operators do not use LVD for prepaid subscribers.

Instead, operators may simply disable call forwarding in the case when the B-party is roaming. That is, calls are not forwarded to voicemail, and no SMS messages notifying the B-party of the missed call are sent. This makes the system less convenient for users, and also results in a loss of revenue for the network operator because the roaming subscriber will not make the return call in response to the SMS message notifying him of the missed call.

SUMMARY

The present invention therefore seeks to provide a system that allows a roaming subscriber to be notified of a missed call, while mitigating at least some of the disadvantages of the systems described above.

According to a first aspect of the present invention, there is provided a method of handling calls in a mobile communication network, the method comprising: in a first node of a home network, receiving a request message, requesting call set-up to a called terminal; and sending a message to a second node of the home network to obtain an address of a mobile switching centre where the called terminal is located. On receiving a reply from the second node, the first node initiates a missed call notification service if it is determined that the called terminal is in a visited network. The first node then initiates a call set-up to the called terminal; and, if it is notified that the call has been released, with no call forwarding having taken place, it notifies the missed call notification service that the call has been released. The missed call notification service causes a message to be sent to the called terminal, notifying it of the missed call.

This has the advantage that the roaming subscriber can be notified of the missed call, without requiring call forwarding involving the visited network.

The step of determining that the called terminal is in a visited network can be accomplished by determining if a Mobile Station Roaming Number contains a code, such as a country code or an operator code, that does not belong to the home network.

The step of causing a message to be sent to the called terminal may comprise sending a request to a Short Message Service Centre, causing a Short Message Service message to be sent to the called terminal.

According to further aspects of the present invention, there are provided a method including steps of the method according to the first aspect, performed in the first node, and a Mobile Switching Centre configured to perform the method.

According to a further aspect of the invention, there is provided a method of handling calls in a service control node of a mobile communication network, comprising receiving a command to initiate a missed call notification service from a mobile switching centre if it is determined that a called terminal is in a visited network. On subsequently receiving a notification that the call has been released, with no call forwarding having taken place a message is caused to be sent to the called terminal, notifying it of the missed call.

The step of causing a message to be sent to the called terminal may comprise sending a request to a Short Message Service Centre, causing a Short Message Service message to be sent to the called terminal.

According to a further aspect of the invention, there is provided a Service Control Point, configured to perform the method.

According to a still further aspect of the present invention, there is provided a method whereby, during a location update, when a first terminal is found to be in a visited network, and when a call forwarding number is found not to be equal to a predetermined number, subscriber data including said call forwarding number is copied to a Visitor Location Register of the visited network. When the first terminal is found to be in a visited network, and when a call forwarding number is found to be equal to the predetermined number, the subscriber data excluding the call forwarding number is copied to a Visitor Location Register of the visited network.

The predetermined number may be a voicemail system number.

According to a further aspect of the present invention, there is provided a Home Location Register for a mobile communication network, configured to perform the method.

DETAILED DESCRIPTION

Figure 1:
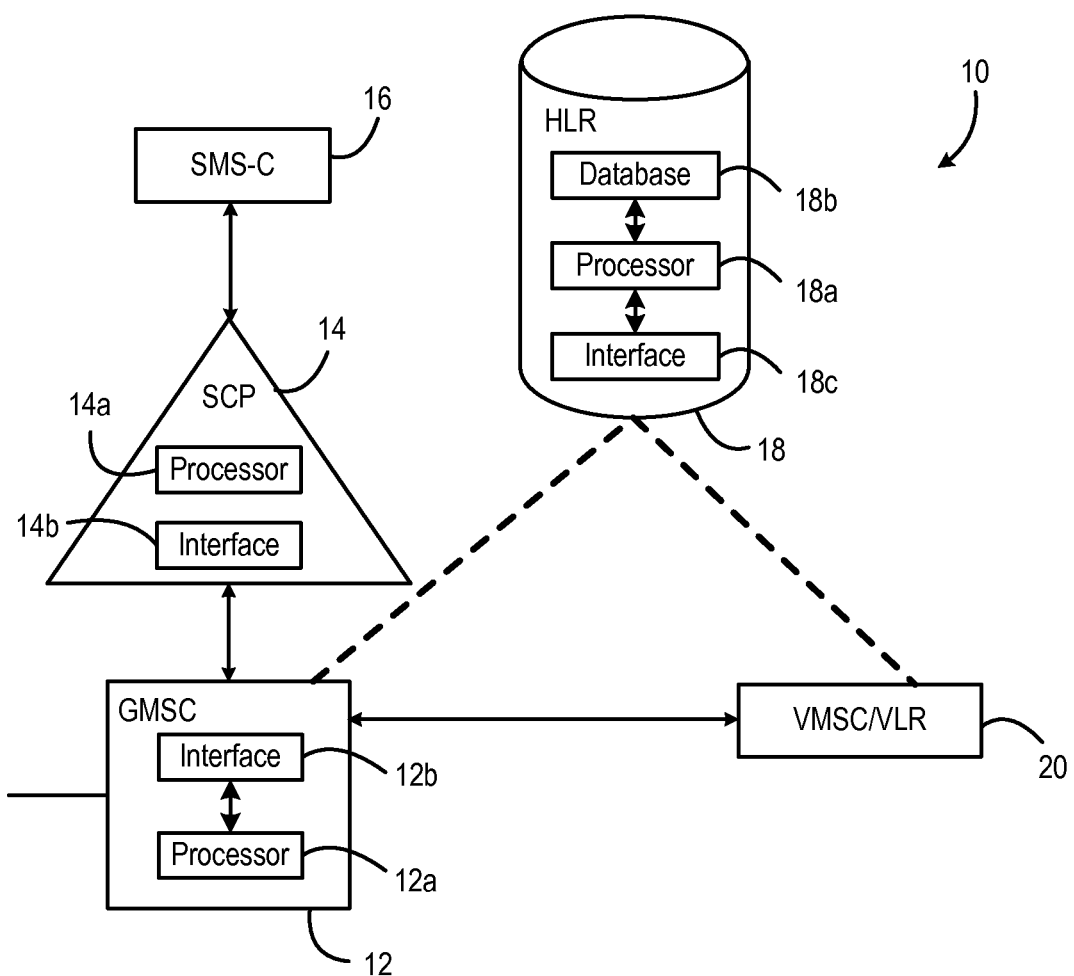
FIG. 1 shows a telecommunication network in accordance with an aspect of the present invention.

FIG. 1 shows a part of a cellular telecommunication network 10, which at this level of generality is essentially conventional, and will therefore be described only in so far as is necessary for an understanding of the present invention.

As is known, the network 10 includes a Gateway Mobile Switching Centre (GMSC) 12 having a processor 12a for controlling its operation and interface circuitry for interfacing as required with other network nodes. The GMSC 12 is connected to the radio access network (not shown) of the cellular network, so that calls are passed therethrough. The GMSC 12 is connected to a Service Control Point (SCP) 14 in the Intelligent Network architecture, that is able to take part in various additional functions of the network, for example as described in more detail below. The SCP 14 has a processor 14a for controlling its operation, and appropriate interface circuitry 14b, and is connected in turn to a Short Message Service Centre (SMS-C) 16, which is able to handle Short Message Service (SMS) messages between subscribers.

Provided in the network 10 is one or more Home Location Register (HLR) 18, which has a processor 18a for controlling its operation, a database 18b for storing data including location information for (i.e. the network address of) the Visited Mobile Switching services Centre (VMSC) where the called terminal is currently registered, and interface circuitry 18c for connecting to other network nodes. Thus, for example, a cellular network will typically include many cells, served by respective base stations of the radio access network, and each active user equipment (i.e. each cellular phone or other mobile device) has a connection with one of these base stations. When the GMSC 12 receives a call to a called terminal, it can retrieve the necessary information from the HLR 18, allowing the call to be routed through the correct VMSC of the cellular network.

A typical cellular network has a limited geographical coverage area, for example one country or a part of a country, and contains multiple GMSCs, such as the GMSC 12, and multiple HLRs, such as the HLR 18.

It is also possible for a user to roam into the geographical coverage areas of other networks, and FIG. 1 shows a part of the network infrastructure in one other network, used for handling calls with user equipments that have roamed into its coverage area. Specifically, FIG. 1 shows the Visited Mobile Switching Centre (VMSC) and Visitor Location Register (VLR) of that other network. FIG. 1 shows the VMSC/VLR as a single block 20, although it will be appreciated that the relevant functionality can be provided in separate equipment if required.

Figure 2:
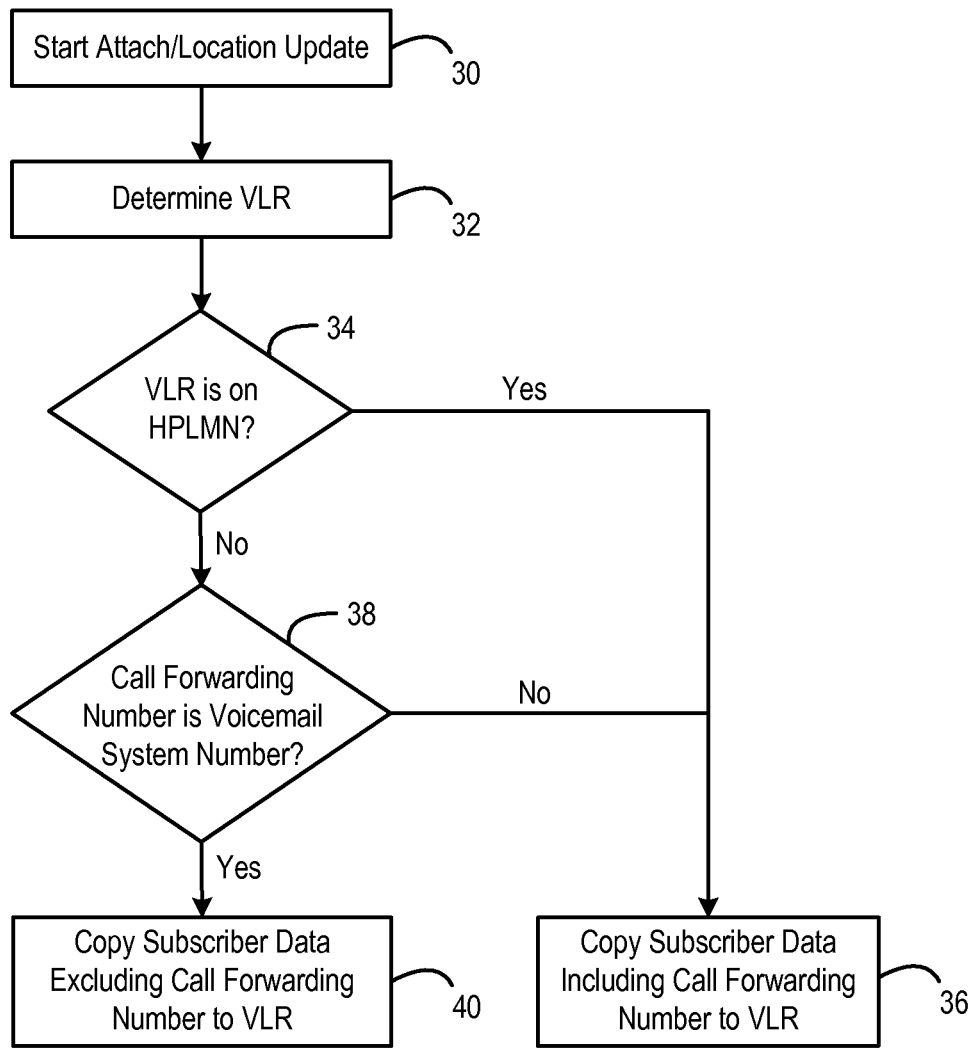
FIG. 2 is a flow chart, illustrating a process performed in a Home Location Register of the network shown in FIG. 1, in accordance with an aspect of the present invention.

FIG. 2 is a flow chart, illustrating a procedure performed in a HLR in accordance with an aspect of the invention, either when a mobile terminal is first attaching to the network, or when the mobile terminal is performing a location update procedure.

Specifically, in step 30, the HLR determines that an attach procedure or a location update procedure is being performed. In step 32, the HLR, as is conventional, identifies the location of the Mobile Switching Centre (MSC) where the mobile terminal is now located, and specifically in step 32 identifies the VLR associated with that MSC. In step 34, it is determined whether the VLR is located in the Home Private Land Mobile Network (HPLMN) of the mobile terminal, or whether the VLR address is an address outside the network of the operator providing the service according to the invention. If it is determined in step 34 that the VLR is in the HPLMN, the process passes to step 36, in which the subscriber data is copied from the HLR to the VLR as is conventional.

If it is determined in step 34 that the VLR is not in the HPLMN, that is, the subscriber is roaming, the process passes to step 38. In step 38, it is determined whether the subscriber has set up a call forwarding number that is not the voicemail system number. If the subscriber has set up a call forwarding number that is not the voicemail system number, the process passes to step 36 as before, and the subscriber data is copied from the HLR to the VLR as is conventional.

However, if it is determined in step 38 that the available call forwarding number is the voicemail system number, the process passes to step 40. In step 40, the subscriber data excluding this call forwarding number is copied from the HLR to the VLR.

Thus, in accordance with this embodiment of the invention, the HLR 18 does not copy the call forwarding number to the VLR if the call forwarding number equals the voicemail system number and if the subscriber is roaming outside his HPLMN.

Figure 3:
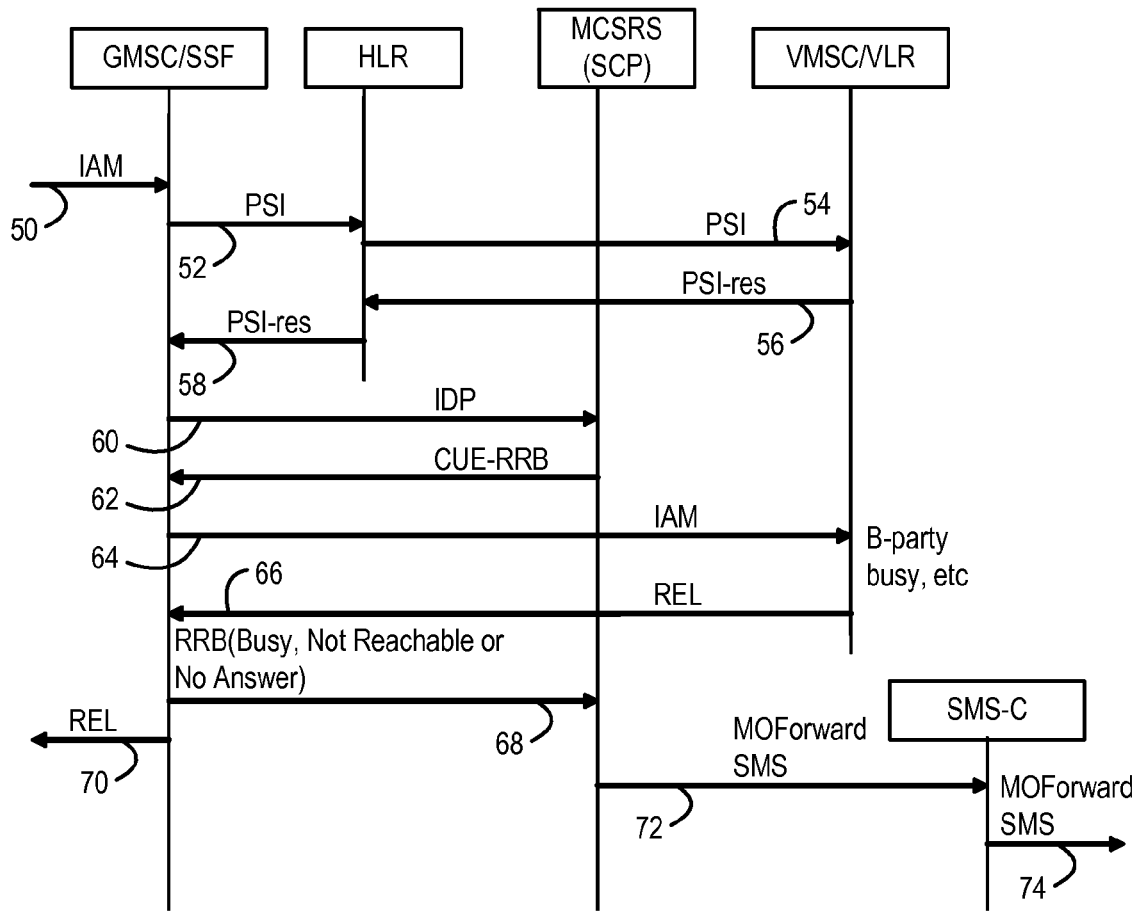
FIG. 3 illustrates a message flow in the network of FIG. 1, in accordance with another aspect of the present invention.

FIG. 3 then illustrates the message flow, when attempting to set up a call, in a process in accordance with an aspect of the present invention. The invention is described with reference to a specific embodiment, in which the cellular network is a Global System for Mobile communication (GSM) network, or a Universal Mobile Telecommunications System (UMTS) network, or another cellular network using an Intelligent Network (IN) architecture, with the messages between nodes of the network being in accordance with the known system of Customised Applications for Mobile networks using Enhanced Logic (CAMEL). Thus, FIG. 3 shows the flow of messages between the Service Switching Function (SSF) located in the Gateway Mobile Switching Centre (GMSC) 12; the Home Location Register (HLR) 18; a Missed Call SMS Roaming subscriber Service (MCSRS) deployed on the Service Control Point (SCP) 14; and the Short Message Service Centre (SMS-C) 16; as well as the Visited Mobile Switching Centre (VMSC)/Visitor Location Register (VLR) 20 of another network.

The procedure for setting up a call from a calling subscriber (the A-party) to a called subscriber (the B-party) starts with an Initial Address Message (IAM) 50, sent to the GMSC 12 from the radio access network. As is conventional, the GMSC 12 sends a Provide Subscriber Information (PSI) message 52 to the HLR 18. Then, the HLR 18, having being notified by the other network that the called subscriber is roaming in that other network, sends a Provide Subscriber Information (PSI) message 54 to the VMSC/VLR 20 of the other network to obtain a Mobile Station Roaming Number (MSRN).

The VMSC/VLR 20 of the other network returns a Provide Subscriber Information result (PSI-res) message 56 to the HLR 18, containing the MSRN, which contains the current visitor country code, the visitor national destination code (VNDC), the identification of the current MSC, and the subscriber number. The HLR 18 returns a further PSI-res message 58 to the GMSC 12.

Figure 4:
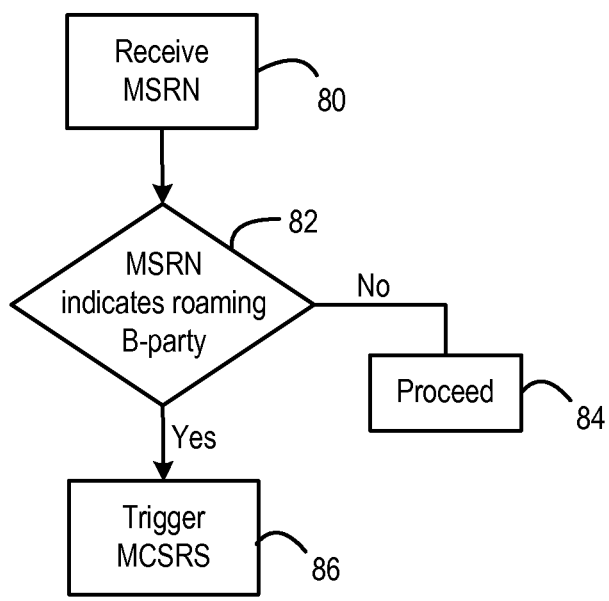
FIG. 4 is a flow chart, illustrating a process performed in a Gateway Mobile Switching Centre of the network shown in FIG. 1, in accordance with another aspect of the present invention.

When the GMSC 12 receives the returned MSRN, it performs the procedure shown in FIG. 4. Specifically, having received the MSRN in step 80, it determines in step 82 whether the MSRN contains a country code and/or operator code that does not belong to its own network operator, indicating that the B-party is roaming. If it is determined in step 82 that the B-party is not roaming, the procedure passes to step 84, in which the call set-up proceeds in a conventional manner. However, if it is determined in step 82 that the B-party is roaming, the procedure passes to step 86, in which the GMSC 12 triggers an Intelligent Networks solution, namely the Missed Call SMS Roaming subscriber service (MCSRS). It is noted that, in this embodiment of the invention, the solution is triggered on the roaming call forwarding leg in the GMSC.

Specifically, the GMSC 12 triggers the MCSRS by sending an Initial Detection Point (IDP) message 60 to the SCP 14. The SCP 14 responds by sending a message to the GMSC 12 asking it to continue the call set-up, and to report its state in the Basic Call State Model (BCSM), that is, a continue and Request Report BCSM (CUE+RRB) message 62. Thus, the MCSRS service monitors the result of the call set-up.

As is conventional, the GMSC 12 attempts to set up the call, by sending an Initial Address Message (IAM) 64 to the VMSC 20 of the B-party. When the B-party is busy, or does not answer, or is Not Reachable, the VMSC will check the VLR to see if the call forwarding numbers are set.

Because the call forwarding numbers were not set by the HLR, as described with reference to FIG. 2, the VMSC will release the call, by sending a conventional release (REL) message 66 to the GMSC 12, containing a conventional cause value (specifying whether the B-party is Busy, or is Not Reachable, or whether the call was not answered).

When the GMSC 12 receives the REL message 66, it reports the release to the MCSRS service via a standard Event Report BCSM (ERB) message 68. In addition, the release is sent to the A-party as the REL message 70, and the call is cleared.

Figure 5:
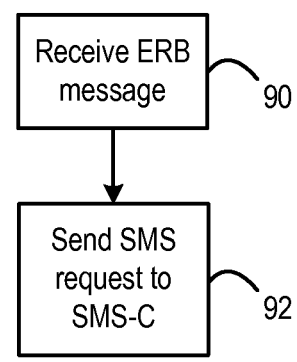
FIG. 5 is a flow chart, illustrating a process performed in a Service Control Point of the network shown in FIG. 1, in accordance with another aspect of the present invention.

FIG. 5 shows the response of the IN Missed Call SMS Roaming subscriber service (MCSRS) deployed on the Service Control Point (SCP) 14 at this point. In step 90, the MCSRS receives the ERB message 68. In response, in step 92, the MCSRS sends a Mobile Originating Forward SMS (MOFSMS) message 72 to the Short Message Service Centre (SMS-C) 16, causing the SMS-C to send an SMS 74 to the B-party. The SMS 74 notifies the B-party of the missed call, and in particular contains the A-number in international format, thereby allowing the B-party to place a return call to the A-party if desired.

Thus, call forwarding is disabled when the B-party is roaming, and as a result the network will release the call if the B-party does not answer. The call release is intercepted, and a missed call SMS is nevertheless sent to the B-party.

The process described so far assumes that the B-party is a postpaid subscriber. However, if the B-party is a prepaid subscriber, the only change is that, on receiving the IAM 50, the GMSC 12 will first trigger the prepaid service, based on the Terminating IN Category Key (TICK) or Terminating CAMEL Subscription Information (T-CSI). Then, when the prepaid service sets up the call, the GMSC will trigger the MCSRS service as discussed previously. As before, when the B-party is busy, does not answer or is not reachable, the call is released. As a result, the prepaid service will not charge for the call.

There is thus described a solution that works equally for both postpaid and prepaid subscribers, providing an enhanced service for subscribers, while being simple for operators to use and potentially generating additional calls for which the operator is able to charge.

The invention claimed is:

1. A method of handling calls in a mobile communication network, the method comprising:
   in a first node of a home network, receiving a request message, requesting call set-up to a called terminal, wherein the called terminal is roaming in a visited network;
   sending a message to a second node of the home network to obtain an address of a mobile switching centre where the called terminal is located, wherein the second node stores a call forwarding number, and wherein the visited network does not store the call forwarding number when the call forwarding number is equal to a predetermined number;
   on receiving a reply from the second node, initiating a missed call notification service when it is determined that the called terminal is in a visited network;
   initiating a call set-up to the called terminal;
   on being notified that the call has been released, with no call forwarding having taken place when a call forwarding number was not stored in the visited network, notifying the missed call notification service that the call has been released, wherein the missed call notification service causes a message to be sent to the called terminal notifying that terminal of the missed call.

2. The method of claim 1, further comprising determining that the called terminal is in a visited network if a Mobile Station Roaming Number contains a code that does not belong to the home network.

3. The method of claim 2, wherein the code is a country code.

4. The method of claim 2, wherein the code is an operator code.

5. The method of claim 1, wherein the missed call notification service causes a message to be sent to the called terminal by sending a request to a Short Message Service Centre, causing a Short Message Service message to be sent to the called terminal.

6. A first Mobile Switching Centre, comprising:
   an interface for connection to a radio access network of a home cellular network, a Service Control Point in an Intelligent Network architecture, a node in the home cellular network, and at least one Mobile Switching Centre in a visited cellular network; and
   a processor configured such that:
      on receiving a request message, the first Mobile Switching Centre requests call set-up to a called terminal and sends a message to the node in the home cellular network to obtain an address of a second Mobile Switching Centre where the called terminal is located, wherein the node stores a call forwarding number;
      on receiving a reply from the node in the home cellular network, and determining from the reply that the called terminal is in a visited network, the first Mobile Switching Centre sends a message to the Service Control Point initiating a missed call notification service, wherein the visited network does not store the call forwarding number when the call forwarding number is equal to a predetermined number;
      the first Mobile Switching Centre initiates a call set-up to the called terminal; and
      on being notified that the call has been released, with no call forwarding having taken place when a call forwarding number was not stored in the visited network, the first Mobile Switching Centre notifies the missed call notification service that the call has been released, such that the missed call notification service causes a message to be sent to the called terminal, notifying it of the missed call.

7. The first Mobile Switching Centre of claim 6, wherein the processor is configured such that the first Mobile Switching Centre determines that the called terminal is in a visited network if a Mobile Station Roaming Number contains a code that does not belong to the home network.

8. The first Mobile Switching Centre of claim 7, wherein the code is a country code.

9. The first Mobile Switching Centre of claim 7, wherein the code is an operator code.

10. The first Mobile Switching Centre of claim 6, wherein the missed call notification service causes a message to be sent to the called terminal by sending a request to a Short Message Service Centre, causing a Short Message Service message to be sent to the called terminal.

11. A method of handling calls in a mobile communication network, the method comprising:
- in a service control node of a home network, receiving a command to initiate a missed call notification service from a mobile switching centre when it is determined that a called terminal is in a visited network, wherein the home network stores a call forwarding number, and wherein the visited network does not store the call forwarding number when the call forwarding number is equal to a predetermined number;
- receiving a notification that the call has been released, with no call forwarding having taken place when a call forwarding number was not stored in the visited network; and
- causing a message to be sent to the called terminal, notifying it of the missed call.

12. The method of claim 11, wherein causing a message to be sent to the called terminal comprises sending a request to a Short Message Service Centre, causing a Short Message Service message to be sent to the called terminal.

13. A Service Control Point in a mobile communications network, comprising:
- an interface for connection to a Mobile Switching Centre of a home network, and to a Short Message Service Centre; and
- a processor configured such that:
  - the Service Control Point initiates a missed call notification service on receiving a command from the Mobile Switching Centre when it is determined that a called terminal is in a visited network, wherein the home network stores a call forwarding number, and wherein the visited network does not store the call forwarding number when the call forwarding number is equal to a predetermined number;
  - the Service Control Point receives a notification from the Mobile Switching Centre in the event that the call is been released, with no call forwarding having taken place when a call forwarding number was not stored in the visited network; and
  - the Service Control Point sends a request to the Short Message Service Centre, causing a Short Message Service message to be sent to the called terminal, notifying it of the missed call.

14. A method of establishing a terminal location in a mobile communication network, the method comprising, during a location update and in a Home Location Register of the mobile communication network:
- when the terminal is found to be in a visited network, and when a call forwarding number is found not to be equal to a predetermined number, copying subscriber data including said call forwarding number to a Visitor Location Register of the visited network; and
- when the terminal is found to be in a visited network, and when a call forwarding number is found to be equal to the predetermined number, copying the subscriber data excluding said call forwarding number to a Visitor Location Register of the visited network.

15. The method of claim 14, wherein the predetermined number is a voicemail system number.

16. A Home Location Register for a mobile communication network, comprising:
- an interface for connection to Mobile Switching Centres in the mobile communication network and to Visitor Location Registers in at least one other mobile communication network; and
- a processor configured such that, during a location update for a terminal:
  - when the terminal is found to be in a visited mobile communication network, and when a call forwarding number is found not to be equal to a predetermined number, the Home Location Register copies subscriber data for said terminal including said call forwarding number to a Visitor Location Register of the visited mobile communication network; and
  - when the terminal is found to be in a visited mobile communication network, and when a call forwarding number is found to be equal to the predetermined number, the Home Location Register copies the subscriber data for said terminal excluding said call forwarding number to a Visitor Location Register of the visited mobile communication network.

17. The Home Location Register of claim 16, wherein the predetermined number is a voicemail system number.

* * * * *